(12) United States Patent
Closs et al.

(10) Patent No.: US 10,414,516 B2
(45) Date of Patent: Sep. 17, 2019

(54) LANDING DEVICE FOR LANDING A SPAN-WISE LOADED AIRCRAFT

(71) Applicant: Airbus Defence and Space GmbH, Taufkirchen (DE)

(72) Inventors: Martin Closs, Munich (DE); Klaus Kittmann, Kirchseeon (DE)

(73) Assignee: AIRBUS DEFENCE AND SPACE GMBH, Taufkirchen (DE)

(*) Notice: Subject to any disclaimer, the term of this patent is extended or adjusted under 35 U.S.C. 154(b) by 274 days.

(21) Appl. No.: 15/370,112

(22) Filed: Dec. 6, 2016

(65) Prior Publication Data

US 2017/0158351 A1 Jun. 8, 2017

(30) Foreign Application Priority Data

Dec. 7, 2015 (EP) ..................................... 15198237

(51) Int. Cl.
*B64F 1/02* (2006.01)
(52) U.S. Cl.
CPC ................ *B64F 1/02* (2013.01); *B64F 1/025* (2013.01)
(58) Field of Classification Search
CPC .................................. B64F 1/02; B64F 1/025
See application file for complete search history.

(56) References Cited

U.S. PATENT DOCUMENTS

| 1,627,614 | A | | 5/1927 | MC Cully | |
|---|---|---|---|---|---|
| 2,920,846 | A | * | 1/1960 | Lingafelter | E01F 3/00 114/261 |
| 3,066,896 | A | * | 12/1962 | Schirtzinger | B64F 1/02 188/298 |
| 3,659,812 | A | * | 5/1972 | Carlsson | B64F 1/02 244/114 R |
| 3,967,704 | A | * | 7/1976 | Ogden | E01C 9/007 404/6 |
| 4,147,317 | A | | 4/1979 | Mayhew et al. | |
| 4,846,457 | A | * | 7/1989 | Vaux | A63C 19/04 472/92 |
| 4,998,717 | A | * | 3/1991 | Vaux | E01C 5/18 404/32 |
| 5,013,029 | A | * | 5/1991 | Vaux | E01C 5/18 404/32 |
| 5,193,764 | A | * | 3/1993 | Larratt | B64F 1/025 188/377 |

(Continued)

FOREIGN PATENT DOCUMENTS

DE 19950674 4/2001
FR 2996211 B1 * 9/2016 .............. B64F 1/007

(Continued)

OTHER PUBLICATIONS

European Search Report, dated May 31, 2016, priority document.

*Primary Examiner* — Philip J Bonzell
(74) *Attorney, Agent, or Firm* — Greer, Burns & Crain, Ltd.

(57) ABSTRACT

A landing device for landing an aircraft thereon. The landing device comprises a first group of supporting elements arranged next to each other in a first direction, each supporting element configured to support a portion of a body or a portion of a wing of the aircraft. Each supporting element is further configured to bow when loaded by the mass of the body portion or the wing portion supported by the respective supporting element.

20 Claims, 2 Drawing Sheets

(56) References Cited

U.S. PATENT DOCUMENTS

| | | | | |
|---|---|---|---|---|
| 5,885,025 A * | 3/1999 | Angley | | B64F 1/025 404/27 |
| 5,902,068 A * | 5/1999 | Angley | | B64F 1/025 404/34 |
| 6,394,391 B1 * | 5/2002 | Lo | | B64F 1/10 244/110 A |
| 6,620,482 B2 * | 9/2003 | Carr | | B64F 1/00 428/15 |
| 6,685,387 B2 * | 2/2004 | Allen | | B64F 1/025 188/377 |
| 6,726,400 B1 * | 4/2004 | Angley | | E01C 9/007 404/27 |
| 6,794,007 B2 * | 9/2004 | Carr | | B64F 1/00 428/15 |
| 6,971,817 B2 * | 12/2005 | Allen | | B64F 1/025 188/377 |
| 7,175,362 B2 * | 2/2007 | Carr | | A01M 29/32 404/1 |
| 7,198,427 B2 * | 4/2007 | Carr | | B64F 1/00 404/72 |
| 7,261,490 B2 * | 8/2007 | Allen | | B64F 1/025 188/376 |
| 7,686,247 B1 * | 3/2010 | Monson | | B64F 1/02 244/110 R |
| 7,798,445 B2 * | 9/2010 | Heppe | | B64F 1/02 244/100 A |
| 7,806,625 B2 * | 10/2010 | Carr | | A01M 29/32 404/72 |
| 7,901,154 B2 * | 3/2011 | Carr | | A01M 29/32 404/27 |
| 8,021,074 B2 * | 9/2011 | Valentini | | B64F 1/025 188/371 |
| 8,021,075 B2 * | 9/2011 | Valentini | | B64F 1/025 188/371 |
| 8,118,255 B1 | 2/2012 | Monson et al. | | |
| 8,579,542 B2 * | 11/2013 | Narmo | | C04B 14/24 404/71 |
| 8,740,141 B2 * | 6/2014 | Prevost | | B64F 1/025 244/110 E |
| 9,157,196 B2 * | 10/2015 | McSwain | | E01C 13/08 |
| 9,745,704 B1 * | 8/2017 | Dotlich | | E01C 11/225 |
| 9,802,717 B2 * | 10/2017 | Valentini | | B64F 1/025 |
| 2003/0215287 A1 * | 11/2003 | Prevost | | B64F 1/36 404/71 |
| 2006/0177270 A1 | 8/2006 | Rastegar et al. | | |
| 2008/0191091 A1 | 8/2008 | Hoisington et al. | | |
| 2008/0308673 A1 * | 12/2008 | Liu | | B64F 1/025 244/110 R |
| 2009/0166469 A1 | 7/2009 | Prevost et al. | | |
| 2010/0030709 A1 * | 2/2010 | Carr | | A01M 29/32 705/500 |
| 2013/0001366 A1 * | 1/2013 | Wolff | | B64F 1/02 244/183 |
| 2013/0020437 A1 | 1/2013 | Valentini et al. | | |
| 2013/0268330 A1 * | 10/2013 | Carr | | A01M 29/32 705/14.4 |
| 2017/0297739 A1 * | 10/2017 | Valentini | | B64F 1/025 |

FOREIGN PATENT DOCUMENTS

| | | | | |
|---|---|---|---|---|
| GB | | 131398 | 8/1919 | |
| GB | | 895228 | 5/1962 | |
| GB | | 2459469 | 10/2009 | |
| GB | | 2459469 A * | 10/2009 | ............... B64F 1/02 |
| GB | | 2476944 A * | 7/2011 | ............. C04B 14/24 |
| WO | | 2008100295 | 8/2008 | |
| WO | WO-2009094566 A3 * | | 4/2016 | ............... B64F 1/02 |

\* cited by examiner

LANDING DEVICE FOR LANDING A SPAN-WISE LOADED AIRCRAFT

CROSS-REFERENCES TO RELATED APPLICATIONS

This application claims the benefit of the European patent application No. 15 198 237.8 filed on Dec. 7, 2015, the entire disclosures of which are incorporated herein by way of reference.

BACKGROUND OF THE INVENTION

The present invention relates to a landing device for landing an aircraft thereon. In particular, the present invention relates to a landing device for a span-wise loaded aircraft type, where the mass is uniformly distributed over the wing span.

A high altitude long endurance aircraft (HALE aircraft), such as a high altitude pseudo-satellite aircraft (HAPS aircraft) is designed to have a very good lift coefficient and is also very light, e.g., around or less than 50 kg including payload. These types of aircraft usually have a long wingspan of 25 m or more. Typically, the majority of the load (energy system, motoric, avionic, payload, etc.) is uniformly distributed over the wing, while the body (fuselage) of the aircraft has very small dimensions or is omitted entirely.

However, the design of these aircraft is very filigree and delicate, which usually results in difficulties when launching and landing the aircraft. While the aircraft may be started with a group of people holding and pushing the aircraft, the landing may result in a damage of the aircraft, and in particular the wing. Due to its size, the wing is likely to touch ground first on a single point, e.g., if there is a small pitch or rolling of the aircraft shortly before touching ground. Landing on a single point leads to a concentrated load for which the wing is not designed, so that the wing is at risk to break due to structure failure.

To avoid such damage, these aircraft types are equipped with multiple skids provided at the main body (the central part of the aircraft) and at a bottom side of the wing on each side of the main body. Such skids, however, mean additional weight to the aircraft structure.

SUMMARY OF THE INVENTION

The present invention is directed to an object of providing a possibility of landing a span-wise loaded aircraft in a safe manner.

A landing device for landing an aircraft thereon comprises a first group of supporting elements arranged next to each other in a first direction. Each supporting element can be configured for supporting a portion of a body or a portion of a wing of the aircraft. Furthermore, each supporting element can be configured to bow when loaded by the mass of the body portion or the wing portion supported by the respective supporting element.

Instead of landing the aircraft on a normal asphalt or concrete runway, the landing device supports the structure of the aircraft at a plurality of positions corresponding to the plurality of supporting elements. This avoids a single concentrated load on the wing when touching the ground. Furthermore, due to the capability of bowing, each supporting element provides for a soft landing of the aircraft. In addition, the bowing supporting elements convert kinetic energy of the landing aircraft into deformation energy, so that the aircraft slows down.

Furthermore, an extent (size) of the first group of supporting elements in the first direction may be greater than an extent of the wings, i.e., the wingspan, of the aircraft. This provides for a sufficient amount of supporting elements to carry the aircraft. In addition, with an increasing number of supporting elements, the individual force applied to the wing at each supporting element decreases. Thus, the bearing force is equally distributed over the entire wingspan, similarly to the load distribution for which the wing is designed. Moreover, due to the greater extent of the first group of supporting elements, the landing of the aircraft is less complicated, since a greater area for landing is available.

The landing device may further comprise a second group of supporting elements arranged next to each other in a second direction perpendicular to the first direction. Thus, the first and second group of supporting elements form an area of supporting elements on which the aircraft can land, decelerate and come to a stop. For example, the aircraft may approach and land in the second direction. The increased number of supporting elements that bow due to the weight of the landing aircraft skidding over them provides for sufficient deceleration of the aircraft. Each bowing supporting element converts kinetic energy of the aircraft into elastic deformation.

According to an aspect, each of the supporting elements of the first and/or second group comprises a base member, and at least one bristle. Such bristle may be of a bendable material. This bendable material provides for bowing of the supporting element and, hence, deceleration of the landing aircraft. In addition, the device on which the aircraft lands is more elastic than conventional runways allowing a softer landing. Furthermore, one end of each bristle may be fixedly coupled to the base member and an opposite end of the bristle freely stands up. For instance, the base member may be at or form a bottom part of the supporting element, while the bristle vertically stands up and the free end of the bristle forms an upper part of the supporting element. It is noted that the bristle/s do/es not have to be exactly vertical, but can also stand at an angle with respect to the base member and/or a horizon.

Furthermore, the free end of each bristle may be configured to bow when the body portion or the wing portion of the aircraft skids over the bristle or lies thereon. In particular, the bristle bows to a side in the direction of flight/skidding of the aircraft. In other words, the bristle bends in the same direction in which the aircraft skids over it.

Using uniform bristles provides for a landing device that can be used in all directions of approach. Each bristle can bow in the direction of the skidding aircraft.

In addition or alternatively, at least a portion of at least some of the bristles at the free end is pre-bent in a direction in which the aircraft approaches and lands. This pre-bent free end portion may form a curvature to ease bowing of the bristle when landing the aircraft. It also avoids that the free end of the bristle could damage the aircraft, and in particular the wing. Moreover, due to the pre-bent free end portion, the bristle already has parts that are more horizontally disposed than other parts. This provides for an increased landing area and, hence, bigger regions for force introduction at the wing and aircraft body.

The at least one bristle may comprise bristles of different length. For example, each supporting element can comprise multiple sets of bristles, each set having a respective bristle length. When the aircraft lands on the bristles, the aircraft will be decelerated by the longest bristles and can immerge deeper into the bristles. Then the aircraft may touch the bristles being shorter than the first ones. This provides for more supporting bristles and additional deceleration of the aircraft.

In addition, the number of bristles per set can be inversely proportional to the respective bristle length of the set. For instance, the supporting element may only include a few, such as one or two, of the longest bristles, and a greater number of shorter bristles, such as two, three or four. The supporting element may even include a third set of shortest bristles. Of course the present disclosure is not restricted to the number of sets of bristles and the number of bristles per set described above. There can be more sets of bristles and, of course, different numbers of bristles per set. Each set may also have the same number of bristles.

Bristles of same and/or different length can be distributed uniformly over the landing device. Using similar or the same bristle length and/or similar or the same sets of bristles provides for a landing device that can be used in all directions of approach.

Furthermore, the number of sets and/or the number of bristles per set may also vary from one group of supporting elements to another group of supporting elements in the second direction. For example, at the beginning of the landing device (the first row/s of supporting elements seen from an approaching aircraft) the supporting elements may include only long bristles. Following groups (rows) of supporting elements may have sets of bristles of different lengths, while at the end of the landing device the supporting elements have a maximum number of sets of bristles of different lengths. Alternatively, at the end of the landing device the supporting elements include only bristles of the shortest length.

Furthermore, the bristles were described above as being of a bendable material. Such bristles may have a solid body formed of this material. Alternatively, at least some of the bristles can be hollow tubes and/or portions of some bristles in a longitudinal direction of the bristle are hollow tubes.

In addition or alternatively, at least some of the bristles may be coated with a material that enhances deceleration of a skidding aircraft. For example, at least some of the bristles may be coated with a rubber material. According to another example, an upper portion of the bristle/s (at the freestanding end) may be made from a different material than a lower portion thereof. The material of the upper portion is capable of bending and, at the same time, has a coefficient of friction optimized for decelerating the landing aircraft. For instance, a plastic material can be used for the bristles. In addition or alternatively, the bristles may be formed out of metal.

Alternatively, at least some of the bristles may be coated with or formed out of a material (at least at their respective upper ends) having a small coefficient of friction. For instance, Polytetrafluoroethylene (PTFE) could be employed. This provides for an even softer landing due to less friction and associated influence on the surface of the aircraft. Such coated or formed bristle/s allow/s protecting fragile aircraft.

Also in addition or alternatively, at least some of the bristles can be inflatable tubes. Such inflatable tubes may be configured to release air when the landing aircraft hits or strikes the bristle, so that the impact of the bristles to the aircraft structure, and in particular the wing, is damped (alleviated). Furthermore, when the aircraft is landed, the air of the inflatable bristles can be removed, so that the aircraft can be slowly set on the ground or base members of the supporting elements. In this case, it is also very convenient to pick up the aircraft "out of" the empty bristles.

According to a further aspect, the landing device may further comprise two holding structures, each aligned in the first direction. Such holding structures may be support beams or ropes spanning in the first direction. Each of the supporting elements may comprise a ribbon, band or belt spanned between the two holding structures. At least some of the supporting elements can be inflatable hoses or tubes providing the properties of the ribbon described herein. The supporting elements may be spanned parallel to each other. Of course, at least some of the supporting elements may run at an angle to each other. Furthermore, the supporting elements may be arranged perpendicular to the holding structures. In addition or alternatively, at least some of the supporting elements may also be arranged at an angle different from 90° with respect to the holding structures.

Advantageously, in order to allow landing an aircraft from different directions, the supporting elements can be arranged horizontally and/or can be spanned in different directions. Furthermore, the supporting elements can be spanned between more than two holding structures.

Furthermore, one of the two holding structures can be arranged higher than the other holding structure. The first holding structure (seen from the approaching aircraft) can be lower than the second holding structure (at the end of the landing device). This achieves a slope of the supporting elements by which the aircraft has to skid upwards, which helps decelerating the aircraft and, hence, shortens the landing distance required for the aircraft.

Alternatively or additionally, each of the ribbons is configured to bow downwards when the body portion or the wing portion of the aircraft skids on the ribbon. In other words, each of the ribbons can buckle or flex down due to the weight of the landing aircraft. On the one hand, this makes the landing of the aircraft softer. On the other hand, the bowing of the ribbons may include a lengthening of the ribbon due to an elastic deformation in the longitudinal direction of the ribbon. The skidding aircraft then follows a path, for example between the two holding structures, which increases the available length of the ribbon for landing the aircraft.

Also alternatively or additionally, the ribbons can be installed loosely, so that they sag between any holding structures. This provides for an increasing deceleration, the further the aircraft approaches the end of the ribbons. Having loose ribbons, the angle of inclination at the end of the landing device increases, the further the aircraft skids to its end. Thus, the skidding aircraft follows an elliptical path. This can protect the aircraft from skidding over the end of the landing device.

BRIEF DESCRIPTION OF THE DRAWINGS

Exemplary aspects of the invention will now be explained with respect to the drawings in which.

DETAILED DESCRIPTION OF THE PREFERRED EMBODIMENTS

Figure 1A:
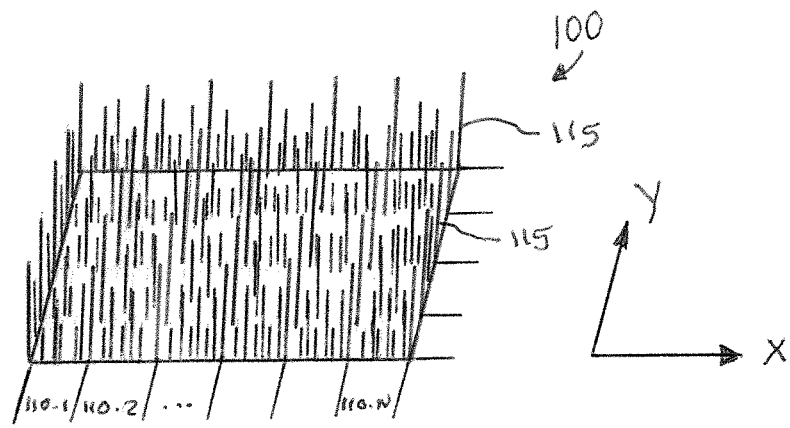
FIG. 1A is a perspective view schematically illustrating a first aspect of a landing device.

As outlined above, FIG. 1A is a perspective view schematically illustrating a first landing device 100. The landing device 100 includes a first group 110-1 of supporting elements 115. The supporting elements 115 of the first group 110-1 are arranged next to each other in a first direction Y. This first direction Y is advantageously perpendicular to an approaching and landing direction of an aircraft. This allows for a simultaneous touch down of the wing of the aircraft on the supporting elements 115 of the first group 110-1. It is noted that the aircraft when landing may fly over the first group 110-1 but will touch down on the supporting elements 115 of another group (110-2 to 110-N). The extent of the supporting elements 115 of the first group 110-1 can be greater than the extent of the wingspan of the landing aircraft. In other words, the first group 110-1 of supporting elements 115 can be wider than the maximum wingspan of a landing aircraft. This provides for a sufficient amount of supporting elements 115 to support the entire wing of the aircraft when skidding and stopping on the supporting elements 115.

The landing device 100 may include a second group 110-2 to 110-N of supporting elements 115 arranged next to each other in a second direction X perpendicular to the first direction Y. It is noted that the landing device 100 may have any number of groups 110 of supporting elements 115 to form an area of a size sufficient to land the aircraft and decelerate the aircraft so that it comes to a full stop. There can also be only one group 110 of supporting elements 115 that, however, has a certain extent in the second direction X.

Figure 1B:
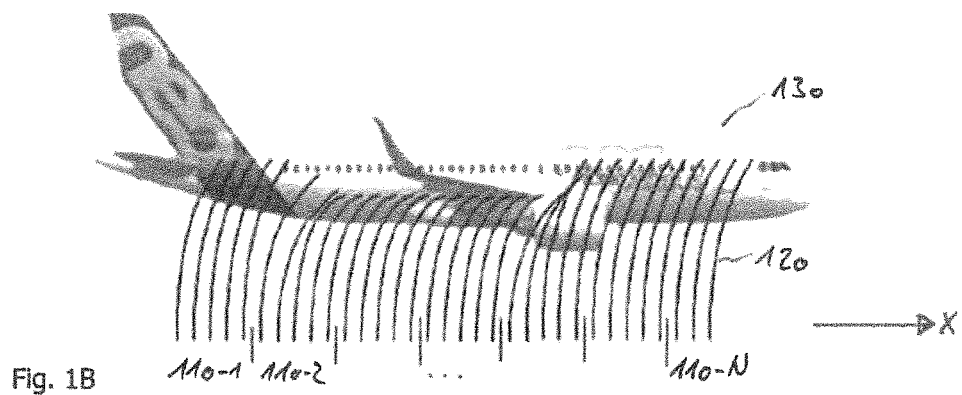
FIG. 1B is a side view of the landing device of FIG. 1A, which additionally depicts a skidding aircraft.

FIG. 1B is a side view of the landing device 100 when viewed in the first direction Y. FIG. 1B also illustrates an aircraft 130 skidding on the landing device 100. When the aircraft 130, and in particular the wing, skids on the supporting elements 115, each supporting element 115 bows due to the mass of the body portion or wing portion supported by the respective supporting element 115. In other words, each of supporting elements 115 is made of a material that bends to the side and/or downwards when loaded with a portion of the mass of the aircraft corresponding to the body portion or wing portion supported by the respective supporting element 115. The bowing or bending of the supporting elements 115 takes up energy from the landing aircraft, thereby decelerating the aircraft 130. When the body portion or wing portion of the aircraft 130 skidded over a supporting element 115, the supporting element 115 resiliently moves back to its previous shape as can be seen in FIG. 1B.

Figure 2:
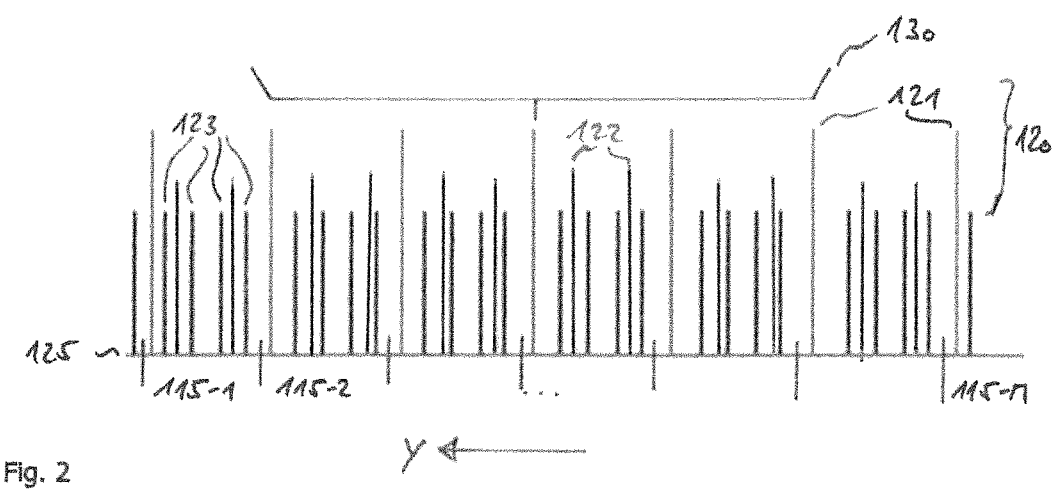
FIG. 2 is a schematic drawing illustrating details of the landing device of FIG. 1A.

The details of the supporting elements 115 are now described with respect to FIGS. 1B and 2, the latter of which is a schematic side view of the landing device 100 when viewed in an approaching direction of the aircraft, such as direction X. At least some of the supporting elements 115 of the first and/or second group 110-1, 110-2 may comprise a base member 125 and at least one bristle 120. The base member 125 is capable of fixedly coupling one end of one or more bristles 120. For instance, the base member 125 may be a base plate having holding elements (not shown) each capable of fixedly coupling to an end of the bristle 120. Alternatively, the base member 125 may be configured to only hold one bristle 120. In this case, the supporting element 115 includes a plurality of base members 125 the number of which corresponds to the number of bristles 120 of the supporting element 115.

The other end of each bristle 120, being at the opposite side than the fixedly coupled end of the bristle 120, freely stands up. At least portions of such bristle 120 may be made of a bendable material. This provides for the free end of each bristle 120 to bow when the body portion or the wing portion of the aircraft 130 skids over or lies on the bristle 120. To provide sufficient bowing and resilient movement of the bristle 120, at least the upper portion at the freestanding end of the bristle 120 should be made out of a bendable material. The bristle 120 may be a solid bristle 120 but can also be, at least partially, a hollow tube.

The free end of the bristle 120 can be pre-bent in a direction in which the aircraft lands, such as direction X. Of course, not only the free end of the bristle 120 can be pre-bent, but also the entire bristle 120 over its entire length can be pre-bent. In any case, the freestanding end of the bristle 120 faces away from any structure of the aircraft 130 when the aircraft approaches. This avoids any damage to the structure of the aircraft 130, for example from a free end of the bristle 120 pinching into the aircraft's structure.

Furthermore, the upper portion of the bristles 120 (at the freestanding upper end) can be coated with a material that has a coefficient of friction which helps decelerating the landing aircraft 130. The coating should be of a material which does not damage the surface of the aircraft, although helping to decelerate it. Alternatively, a coating is used that helps gliding the aircraft to avoid damage to the aircraft due to higher frictional forces and generation of heat. The entire surface of the bristle 120 may be coated with one of the described materials. Alternatively, only a part of the surface of the bristle 120 is coated, for example the surface facing the landing aircraft 130.

As is best seen in FIG. 2, at least one bristle may have a different length than an/other bristle/s. Each supporting element 115 may have multiple sets of bristles 120, each set having a respective bristle length. A first illustrated supporting element 115-A as illustrated in FIG. 2 has one bristle 121 that has the maximum length of all bristles 120, two bristles 122 having a medium length, and four bristles 123 having the minimum length of all bristles 120. It is to be understood that the number of different lengths of the bristles 120 is not restricted to three, but can be more or less. Furthermore, other supporting elements (115-B to 115-M) may have the same sets of bristles 120 with bristles of the same length as illustrated in FIG. 2. Alternatively, the other supporting elements (115-B to 115-M) may have a different number of sets of bristles 120.

The number of bristles 120 having the same length is also not restricted to the illustrated and described number, but can be more or less bristles 120. For example, the number of bristles 120 per set of same length can be inversely proportional to the respective bristle length of the set. This provides for a smooth and soft landing of the aircraft 130, since the aircraft 130 will touch on a few longest bristles 121 first which slowly decelerates the aircraft 130. The slower the aircraft becomes, the deeper the aircraft 130 will "sink" into the bristles 120 due to less lift of the wing. Then the aircraft 130 will touch more and more bristles 120, such as the longest bristles 121 and medium length bristles 122, followed by all bristles 121, 122, 123. This does not only gain the deceleration effect of the bristles 120 to the aircraft 130, but also supports the aircraft 130 on an increasing number of bristles 120. Thus, the reduction of lift is substituted by the increasing number of bristles 120 supporting the aircraft 130 and a very soft landing of the aircraft 130 can be achieved.

Furthermore, supporting elements 115 in each group 110 may have the same number of sets of bristles 120 but with bristles 120 of different lengths. For example, the supporting elements 115 in one group 110 and being in the center of the landing device 100 may have longer bristles than the supporting elements 115 on an outer side of the group 110 (the outer side of the landing device 100), or vice versa. Similarly, the groups (110-1 to 110-N) of supporting elements 115 may have bristles 120 of different lengths and/or sets of bristles 120 of varying bristle lengths. For instance, the first group 110-1 may have more bristles 120 of the maximum length, while the groups 110-2 to 110-N further down in the landing direction (direction X) have more bristles 120 of medium length and/or the minimum length.

In a modification of the supporting elements 115, at least one of the bristles 120 is an inflatable tube. This modification is applicable to all described bristles independent of the described type, length etc. The inflatable tube is also bendable due to its hollow interior. The inflatable tube can also be equipped with valves, flaps or openings, so that air can escape from the inflatable tube when it is hit or struck by the landing aircraft 130. This also dissipates kinetic energy of the landing aircraft 130. When the aircraft 130 comes to a full stop, the air of the inflatable tubes can be fully released. This allows an easy way of reaching the aircraft after it has landed and get it out of the inflatable bristles 120 in order to carry it away.

Figure 3:
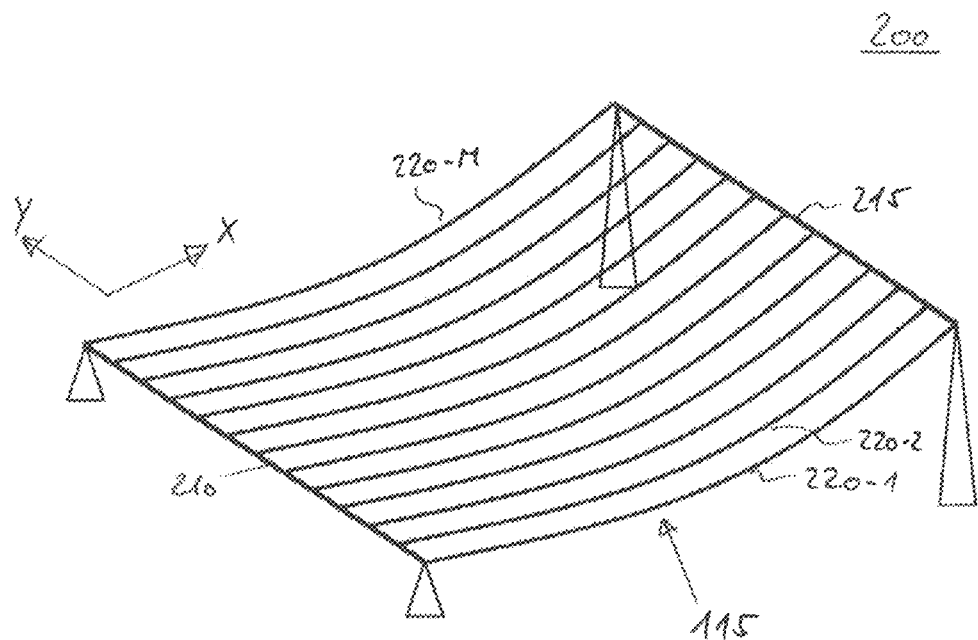
FIG. 3 is a perspective view schematically illustrating a second aspect of a landing device.

FIG. 3 depicts a perspective view schematically illustrating a second aspect of a landing device 200. Elements that are similar or the same as those described with respect to FIGS. 1A to 2 are provided with the same reference numerals and a description thereof is omitted in order to avoid a redundant description.

The landing device 200 may comprise two or more holding structures, such as holding structure 210 and holding structure 215. These holding structures 210, 215 may be a support beam or a rope. The holding structures 210, 215 are disposed perpendicular to an approaching direction of the aircraft 130, such as direction Y. In-between the two or more holding structures 210, 215 are a plurality of supporting elements 115. Each of the supporting elements 115 may be a ribbon 220-A, 220-B . . . 220-M or rope or other element capable of bowing when loaded by the mass of a body portion or a wing portion of the landing aircraft 130.

Figure 4:
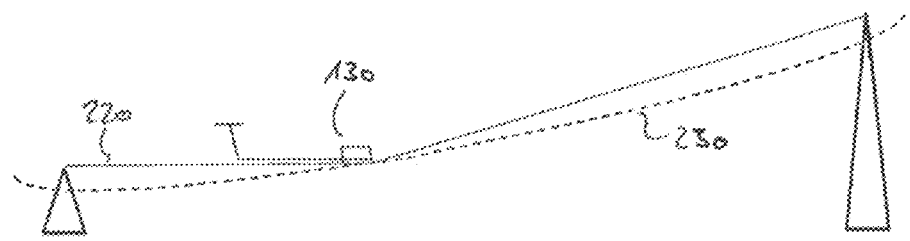
FIG. 4 is a side view of the landing device of FIG. 3.

A side view of the landing device 200 is illustrated in FIG. 4, where an aircraft 130 has already touched the ribbon 220. Each ribbon 220 is capable of bending down when the body portion or wing portion of the aircraft 130 skids on the ribbon 220. This can be achieved by an elastic deformation of the ribbon 220, and in particular an elastic deformation in the longitudinal direction of the ribbon 220. Thereby, the length of each ribbon 220, i.e., the supporting elements 115, extends, so that the available length for landing the aircraft 130 increases. The aircraft 130 then skids on the ribbons 220 on a circular or elliptical path 230 depicted in FIG. 4 as a dashed line.

Furthermore, in order to reduce the required length for landing the aircraft 130 and bringing it to a full stop, the ribbons 220 can be installed loosely, so that they sag between any holding structures. This provides for an elliptical path (depicted in FIG. 4 as a dashed line) which the aircraft 130 follows when skidding over the ribbons 220. Such elliptical path has an angle of inclination at the end of the landing device which increases the further the aircraft skids to the end. This provides for an increasing deceleration the further the aircraft approaches the end of the ribbons. Thus, the skidding aircraft can be protected from skidding over the end of the landing device.

Furthermore, in order to improve deceleration of the aircraft 130 or protect the aircraft 130 from generation of heat, one or more of the ribbons 220 can be coated with one of the materials having a high or small coefficient of friction, respectively, as described above with respect to the bristles 120 (FIGS. 1 and 2). The ribbons may also be made of a material having such properties. At least one holding structure 215 further down in the landing direction (such as direction X) can be arranged higher than another holding structure 210 at the beginning of the landing device 200 (seen from the approaching aircraft 130). This provides for a slope, so that the aircraft 130 skids uphill, further helping to decelerate the aircraft 130.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing device for landing an aircraft thereon, the landing device comprising:
   a first group of three or more supporting elements comprising elongated generally vertically arranged solid members having an axial length arranged next to each other in a first direction, each supporting element configured to directly engage and support a portion of a body or a portion of a wing of the aircraft,
   wherein each supporting element is further configured to bow along the axial length when loaded by the mass of the body portion or the wing portion supported by the respective supporting element.

2. The landing device according to claim 1, wherein an extent of the first group of supporting elements in the first direction is greater than an extent of the wing span of the aircraft.

3. The landing device according to claim 1, further comprising a second group of supporting elements arranged next to each other in a second direction perpendicular to the first direction.

4. The landing device according to claim 3, wherein each of the supporting elements of the first and second group comprises:
   a base member; and
   at least one elongated bristle of a solid bendable material, wherein a lower end of each bristle is fixedly coupled to the base member and an opposite upper end freely stands up and is configured and positioned to directly engage with the portion of the body or the portion of the wing of the aircraft.

5. The landing device according to claim 4, wherein the upper free end of each bristle is configured to bow when the body portion or the wing portion of the aircraft skids over the bristle.

6. The landing device according to claim 4, wherein at least an end portion of at least some of the bristles at the upper free end is pre-bent in a direction in which the aircraft lands.

7. The landing device according to claim 4, wherein the at least one bristle comprises bristles of different lengths.

8. The landing device according to claim 7, wherein each supporting element comprises multiple sets of bristles, each set having a respective bristle length.

9. A landing device for landing an aircraft thereon, the landing device comprising:
   a first group of supporting elements comprising elongated members having an axial length and a free upper end arranged next to each other in a first direction, each supporting element configured to directly engage and support a portion of a body or a portion of a wing of the aircraft,
   wherein at least an end portion of at least some of the supporting elements at the upper free end is pre-bent and each supporting element is further configured to bow along the axial length when loaded by the mass of the body portion or the wing portion supported by the respective supporting element.

10. The landing device according to claim 9, wherein at least some of the elongated members are inflatable tubes.

11. The landing device according to claim 9, further comprising a second group of supporting elements arranged next to each other in a second direction perpendicular to the first direction.

12. The landing device according to claim 11, wherein each of the supporting elements of the first and second group comprises:
   a base member; and
   at least one elongated bristle of a bendable material, wherein a lower end of each bristle is fixedly coupled to the base member and an opposite upper end freely stands up and is configured and positioned to directly engage with the portion of the body or the portion of the wing of the aircraft.

13. The landing device according to claim 11, wherein the upper free end of each bristle is configured to bow when the body portion or the wing portion of the aircraft skids over the bristle.

14. The landing device according to claim 11, wherein the at least one bristle comprises bristles of different lengths.

15. The landing device according to claim 14, wherein each supporting element comprises multiple sets of bristles, each set having a respective bristle length.

16. A landing device for landing an aircraft thereon, the landing device comprising:
   a first group of supporting elements comprising elongated members having at least two different axial lengths arranged next to each other in a first direction, each supporting element configured to directly engage and support a portion of a body or a portion of a wing of the aircraft,
   wherein each supporting element is further configured to bow along the axial length when loaded by the mass of the body portion or the wing portion supported by the respective supporting element.

17. The landing device according to claim 16, wherein at least some of the elongated members are inflatable tubes.

18. The landing device according to claim 16, further comprising a second group of supporting elements arranged next to each other in a second direction perpendicular to the first direction.

19. The landing device according to claim 18, wherein each of the supporting elements of the first and second group comprises:
   a base member; and
   at least one elongated bristle of a bendable material, wherein a lower end of each bristle is fixedly coupled to the base member and an opposite upper end freely stands up and is configured and positioned to directly engage with the portion of the body or the portion of the wing of the aircraft.

20. The landing device according to claim 19, wherein each supporting element comprises multiple sets of bristles, each set having a respective bristle length.

* * * * *